(12) United States Patent
Dammert et al.

(10) Patent No.: US 6,185,349 B1
(45) Date of Patent: Feb. 6, 2001

(54) MULTIMODAL POLYMER COMPOSITION

(75) Inventors: Ruth Dammert, Västra Frölunda (SE); Eeva-Leena Heino, Helsingfors; Tarja Korvenoja, Espoo, both of (FI); Hans-Bertil Martinsson, Varekil (SE)

(73) Assignee: Borealis Polymers Oy, Porvoo (FI)

(*) Notice: Under 35 U.S.C. 154(b), the term of this patent shall be extended for 0 days.

(21) Appl. No.: 09/262,145

(22) Filed: Mar. 3, 1999

(30) Foreign Application Priority Data

Dec. 18, 1998 (SE) .................................................. 9804407

(51) Int. Cl.⁷ .............................. G02B 6/44; C08L 23/18

(52) U.S. Cl. ........................... 385/100; 385/113; 385/141; 525/240

(58) Field of Search .................................. 385/100, 105, 385/107, 113, 141, 103; 525/240, 199

(56) References Cited

U.S. PATENT DOCUMENTS

| | | | |
|---|---|---|---|
| 3,646,155 | 2/1972 | Scott | 525/240 X |
| 3,749,629 | 7/1973 | Andrews et al. | 385/147 X |
| 4,117,195 | 9/1978 | Swarbrick et al. | 428/379 |
| 4,286,023 | 8/1981 | Ongchin | 428/516 |
| 4,297,310 | 10/1981 | Akutsu et al. | 264/83 |
| 4,351,876 | 9/1982 | Doi et al. | 428/349 |
| 4,397,981 | 8/1983 | Doi et al. | 524/465 |
| 4,413,066 | 11/1983 | Isaka et al. | 521/149 |
| 4,446,283 | 5/1984 | Doi et al. | 525/344 |
| 4,456,704 | 6/1984 | Fukumara et al. | 521/79 |
| 4,547,551 | 10/1985 | Bailey et al. | 525/240 X |
| 4,576,993 | 3/1986 | Tamplin et al. | 525/240 |
| 4,795,482 | 1/1989 | Gioffre et al. | 55/75 |
| 4,812,505 | 3/1989 | Topcik | 524/377 |
| 4,970,278 | 11/1990 | Komabashiri et al. | 526/62 |
| 5,047,468 | 9/1991 | Lee et al. | 525/53 |
| 5,149,738 | 9/1992 | Lee et al. | 525/53 |
| 5,380,803 | 1/1995 | Coutant et al. | 525/240 |
| 5,382,631 | 1/1995 | Stehling et al. | 525/240 |
| 5,453,322 | 9/1995 | Keogh et al. | 428/379 |
| 5,459,187 | * 10/1995 | Taylor et al. | 524/275 |
| 5,521,264 | 5/1996 | Mehra et al. | 526/68 |
| 5,534,572 | * 7/1996 | Taylor et al. | 524/275 |
| 5,550,193 | * 8/1996 | Chiu et al. | 525/199 |
| 5,574,816 | * 11/1996 | Yang et al. | 385/109 |
| 5,580,493 | 12/1996 | Chu et al. | 252/511 |
| 5,582,923 | 12/1996 | Kale et al. | 428/523 |
| 5,718,974 | 2/1998 | Kmiec | 428/383 |
| 5,719,218 | 2/1998 | Sarma | 524/100 |
| 5,731,082 | 3/1998 | Gross et al. | 385/101 X |
| 5,736,258 | 4/1998 | Moy | 525/240 X |
| 5,798,427 | 8/1998 | Foster et al. | 525/240 X |
| 5,807,635 | 9/1998 | Cogen et al. | 428/379 |
| 5,891,979 | 4/1999 | Dammert et al. | 528/18 |
| 5,911,023 | * 6/1999 | Risch et al. | 385/100 |

FOREIGN PATENT DOCUMENTS

| | | | |
|---|---|---|---|
| 0 040 992 | 5/1984 | (EP) | 525/240 X |
| 0 041 796 | 8/1984 | (EP) | 525/240 X |
| 0 207 627 A2 | 1/1987 | (EP) | 385/141 X |
| 0 207 627 A3 | 1/1987 | (EP) | 385/141 X |
| 0 022 376 | 3/1987 | (EP) | 525/240 X |
| 0 214 099 A2 | 3/1987 | (EP) | 385/101 X |
| 0 237 294 | 9/1987 | (EP) | 525/240 X |
| 0 318 841 | 6/1989 | (EP) | 525/240 X |
| 0 334 993 A2 | 10/1989 | (EP) | 385/141 X |
| 0 348 978 A2 | 1/1990 | (EP) | 385/147 X |
| 0 369 436 A2 | 5/1990 | (EP) | 385/141 X |
| 0 193 317 B1 | 9/1990 | (EP) | 385/141 X |
| 0 401 540 A2 | 12/1990 | (EP) | 385/141 X |
| 0 460 936 A1 | 12/1991 | (EP) | 525/240 X |
| 0 475 064 A1 | 3/1992 | (EP) | 525/240 X |
| 0 497 530 A2 | 8/1992 | (EP) | 525/240 X |
| 0 533 160 | 3/1993 | (EP) | 525/240 X |
| 0 535 230 A1 | 4/1993 | (EP) | 525/240 X |
| 0 538 033 A1 | 4/1993 | (EP) | 525/240 X |
| 0 540 075 A1 | 5/1993 | (EP) | 525/240 X |
| 0 420 271 B1 | 12/1994 | (EP) | 385/101 X |
| 0 517 868 | 11/1995 | (EP) | 525/240 X |
| 0 688 794 | 12/1995 | (EP) | 525/240 X |
| 0 750 319 A1 | 12/1996 | (EP) | 385/101 X |
| 980788 | 4/1998 | (FI) | 525/240 X |
| 942369 | 11/1963 | (GB) | 525/240 X |
| 2 028 831 | 3/1980 | (GB) | 525/240 X |
| 63-279503 | 11/1988 | (JP) | 525/240 X |
| 353509/1992 | 12/1992 | (JP) | 525/240 X |
| WO 91/09075 | 6/1991 | (WO) | 525/240 X |
| WO 92/12182 | 7/1992 | (WO) | 525/240 X |
| WO 92/13029 | 8/1992 | (WO) | 525/240 X |
| WO 95/10548 | 4/1995 | (WO) | 525/240 X |
| WO 97/03124 | 1/1997 | (WO) | 385/100 X |

OTHER PUBLICATIONS

JP 2–235740 abstract. Jujo Paper Co Ltd, Sep. 18, 1990, abstract, figure 1. Japan, vol. 14, No. 552, M–1056.
JP 06340036 A abstract. Goyo PaperWorking Co Ltd, Dec. 13, 1994. Japan, vol. 94, No. 12.

(List continued on next page.)

Primary Examiner—Brian Healy
(74) Attorney, Agent, or Firm—Merchant & Gould P.C.

(57) ABSTRACT

A multimodal polymer composition for fiber optical cables and a fiber optical cable comprising the composition are disclosed. The composition is characterized in that it comprises a multimodal polyethylene with a density of 0.920–0.965 g/cm³ and a viscosity at a shear stress of 2.7 kPa ($\eta_{2.7kPa}$) of at least 150 kPa.s, said multimodal polyethylene comprising a low molecular weight (LMW) ethylene homo- or copolymer fraction and a high molecular weight (HMW) ethylene copolymer fraction, said multimodal polymer composition having a weight ratio of the LMW fraction to the HMW fraction of (35–55):(65–45). Preferably, the multimodal polyethylene is a bimodal polyethylene and has a shear thinning index (SHI), defined as the ratio of the viscosities at shear stresses of 2.7 and 210 kPa, respectively, of $SHI_{2.7/210}$=20–150. Also, preferably, the multimodal polyethylene has a $MFR_5$ of 0.1–2.0 g/10 min and a melt strength at 190° C. of at least 4 g. The multimodal polymer composition is particularly useful as a material for slotted core elements of fiber optical cables of the slotted core type.

15 Claims, No Drawings

OTHER PUBLICATIONS

JP 01100803 A2 abstract. STN International, File CAPLUS, CAPLUS accession No. 1989:555983, Doc. No. 111:155983, Hitachi Cable, Ltd.: "Hindered amine–containing crosslinked polyethylene electric insulators for cables and wires": Apr. 19, 1989.

JP 56065667 A abstract. Jun. 3, 1981.

WPI, Derwent Accession No. 90–326069, Jujo Paper MFG KK: "Blank for paper container for food packaging—comprises paper board, thermoplastic layer laminated for outside of container and two resin layers contain deodorise;" & JP A 2235740, 900918.+.

WPI, Derwent accession No. 77–85827Y, Sumitomo Chem Co. Ltd: "Straight chain ethylene copolymers preparation copolymerise ethylene, glycol mono–acrylate and ethylenically unsaturated monomer," JP A 52126495, 441024, DW7748. ( No Date of Publication).

International Search Report for PCT/SE94/00773 dated Mar. 14, 1995.

International Search Report for PCT/SE94/01028 dated Mar. 14, 1995.

International Search Report for PCT/SE96/00900 dated Oct. 14, 1996.

International Search Report for PCT/SE97/01197 dated Oct. 28, 1997.

International Search Report for PCT/SE98/00013 dated May 5, 1998.

International Search Report for PCT/SE98/01786 dated Feb. 2, 1999.

International Search Report for PCT/SE98/01894 dated Feb. 2, 1999.

International Search Report (revised) for PCT/SE98/01894 dated May 4, 1999.

International Search Report for PCT/SE98/01949 dated Feb. 24, 1999.

International–Type Search Report for search request No. SE98/00591 dated Jan. 29, 1999.

Mikko Saikkonin, "Extrusion of slotted core elements", Wire Technology International, Nov. 1995 .

Williams et al., Polymer Letters, vol. 6, pp. 621–624 (1968).

\* cited by examiner

MULTIMODAL POLYMER COMPOSITION

FILED OF THE INVENTION

The present invention relates to a multimodal polymer composition for fibre optic cables and to a fibre optic cable.

TECHNICAL BACKGROUND

Fibre optical cables have been used for many years to transmit information. The fibre optical cables includes hair-thin optical fibres as the transmission medium. These optical fibres are protected by core or buffer tube structures from external forces and elements. Depending on the construction, the fibre optic cables may be divided in four different categories. These are the slotted core type, the tight-coated tube type, the stranded-loose tube type, and the central tube type. Some of these categories can be subdivided further depending on how the fibres are inserted into the core. Thus, the fibres may be inserted as individual fibres, fibre ribbons, or fibre bundles. The most frequently used type of fibre optic cable today is the stranded-loose tube type, but an increasing interest has been shown in the other types, especially the slotted core type which is of particular significance in connection with the present invention.

As an example of fibre optic cables reference may be made to U.S. Pat. No. 5,574,816 which discloses buffer tubes for optical fibre cables.

In the stranded-loose tube type cable the optical fibres reside in protecting and supporting elements in the form of gel filled buffer tubes. These buffer tubes are stranded around a central strengthening member.

In a fibre optical cable of the slotted core type, the optical fibres reside in gel filled channels or slots in the surface of a so-called slotted core supporting element. The core has the form of a central strengthening member of steel or fibre glass reinforced plastic around which is extruded a plastic rod with circumferential slots or groves in the surface. These slots of the slotted core are symmetrical and form a winding helical or SZ like path along the longitudinal axis of the cable. The optical fibres inserted into the slots may be loose fibres or fibre ribbons. The slotted core with its optical fibre and gel filled slots is secured with a binding tape and covered by an outer sheathing. For further information regarding fibre optical cables of the slotted core type reference may be made to an article by Mikko Saikkonen, "Extrusion of slotted core elements", Wire Technology International, November 1995.

The supporting elements, such as the slotted core elements for slotted core type cables and the buffer tubes of the stranded loose tube type cables are made to very exacting requirements. This puts very severe requirements on the materials used for these elements. Normally, the elements are made of polymer materials by melt extrusion. For easy production the polymer material should have a good melt processability; to cope with the mechanical stresses it is exposed to in use it should have good mechanical properties such as a sufficient strength in the solid state; and, very important particularly to the slotted core type cable, the polymer material should have a good dimensional stability to keep the profile shape stable, i.e. so that the ridges of the slotted core are not deformed or collapses. Another important property is the melt strength of the material, and further, the polymer material should have a low shrinkage. Many of these requirements are opposed to each other, i.e. if one property of the polymer material is optimized another property is likely to be deleteriously affected. The polymer materials used hitherto which are mostly unimodal polyethylene polymers therefore tend to be compromises with regard to their properties.

There is an ongoing need in the art for improved polymer materials for fibre optical cables, and more particularly for supporting elements such as slotted cores and buffer tubes. Specifically there is a need for a polymer material with improved dimensional stability and the need for this is particularly strong with regard to slotted cores.

SUMMARY OF THE INVENTION

It has now been discovered that the above deficiencies of the prior art may be alleviated or eliminated with an improved supporting element, such as a slotted core, provided for a fibre optical cable if a certain defined type of multimodal polymer composition is used as the material for the supporting element. The multimodal polymer composition of the present invention may be used for supporting elements of all types of fibre optical cables, such as buffer tubes and slotted cores, but in view of its outstanding dimensional stability it is of particular advantage as a material for the slotted core of fibre optical cables of the slotted core type. The superior properties of the multimodal polymer composition of the present invention are achieved by carefully selecting certain parameters of the polymer composition. Thus, the polymer composition should comprise a multimodal polyethylene having a low to high density, a high viscosity at low shear stress, and a selected ratio between its low molecular weight fraction and high molecular weight fraction.

Thus, the present invention provides a multimodal polymer composition for fibre optical cables, characterized in that it comprises a multimodal polyethylene with a density of 0.920–0.965 g/cm$^3$ and a viscosity at a shear stress of 2.7 kPa ($\eta_{2.7\ kPa}$) of at least 150 kPa.s, said multimodal polyethylene comprising a low molecular weight (LMW) ethylene homo- or copolymer fraction and a high molecular weight (HMW) ethylene copolymer fraction, said multimodal polyethylene composition having a weight ratio of the LMW fraction to the HMW fraction of (35–55): (65–45).

Further, the present invention provides a fibre optical cable, characterized in that the cable has a fibre supporting element selected from slotted cores and buffer tubes, and that the fibre supporting element con- sists of a multimodal polymer composition according to any one of claims 1–13.

Other distinguishing features and advantages of the invention will appear from the following specification and the appended claims.

DETAILED DESCRIPTION OF THE INVENTION

As stated above the multimodal polymer composition of the present invention is a multimodal polyethylene.

The "modality" of a polymer refers to the form of its molecular weight distribution curve, i.e. the appearance of the graph of the polymer weight fraction as function of its molecular weight. If the polymer is produced in a sequential step process, utilizing reactors coupled in series and using different conditions in each reactor, the different fractions produced in the different reactors will each have their own molecular weight distribution. When the molecular weight distribution curves from these fractions are superimposed into the molecular weight distribution curve for the total resulting polymer product, that curve will show two or more maxima or at least be distinctly broadened in comparison with the curves for the individual fractions. Such a polymer product, produced in two or more serial steps, is called bimodal or multimodal depending on the number of steps. In the following all polymers thus produced in two or more sequential steps are called "multimodal". It is to be noted here that also the chemical compositions of the different fractions may be different. Thus one or more fractions may consist of an ethylene copolymer, while one or more others may consist of ethylene homopolymer.

The multimodal polyethylene of the present invention is a low to high density polyethylene, as mentioned above, and has a density of 0.920–0.965 g/cm$^3$, preferably 0.940–0.960 g/cm$^3$.

The multimodal polyethylene of the present invention comprises a low molecular weight (LMW) ethylene homo- or copolymer fraction and a high molecular weight (HMW) ethylene copolymer fraction. Depending on whether the multimodal polyethylene is bimodal or has a higher modality the LMW and HMW fractions may comprise only one fraction each or include sub-fractions, i.e. the LMW fraction may comprise two or more LMW sub-fractions and similarly the HMW fraction may comprise two or more HMW sub-fractions. As a matter of definition, the expression "ethylene homopolymer" used herein relates to an ethylene polymer that consists substantially, i.e. to at least 97% by weight, preferably at least 99% by weight, more preferably at least 99.5% by weight, and most preferably at least 99.8% by weight of ethylene and thus is an HD ethylene polymer which preferably only includes ethylene monomer units.

In the present invention it is important that the proportions of the LMW and HMW fractions (also known as the "split" between the fractions) are selected properly. More particularly, the weight ratio of the LMW fraction to the HMW fraction should lie in the range (35–55):(65–45), preferably (43–51):(57–49), most preferably (44–50): (56–50). It is important that the split lies within these ranges, because if the proportion of the HMW fraction becomes too great it results in too low strength values and if it is too low it results in an unacceptable formation of gels.

In order to achieve the desired dimensional stability characteristics of the multimodal polyethylene of the present invention it is important that the polymer after being extruded and before being cooled does not flow or deform.

This is of particular importance in connection with fibre optical cables of the slotted core type. The polymer should have such a dimensional stability that the dimensions of the slots and ridges of the slotted core remain intact in use, i.e. the slots and ridges must not be deformed. In the present invention the dimensional stability of the multimodal polyethylene is defined in terms of its viscosity ($\eta$) at a constant shear stress of 2.7 kPa at a temperature of 190° C., i.e $\eta_{2.7 kPa}$. The viscosity of the polymer at this shear stress is a measure of its average molecular weight and has been found to be inversely proportional to the flow of the polymer, i.e. the greater the viscosity the lower the flow. At the present invention the viscosity at 2.7 kPa and 190° C. should be at least 150 kpa.s, preferably 150–400 kpa.s. A more detailed description of the steps of the method for determination of the viscosity of the polymer at 2.7 kPa and 190° C. is given below.

Rheology measurements according to ASTM D 4440-95a were used to characterize other important properties of the polymer.

The use of rheology is advantageous in those cases where the high molecular weight end of the molecular weight distribution is important. Typically, size exclusion chromatography (gel permeation chromatography), which often is used to measure the molecular weight distribution, is not sensitive enough in this molecular weight range.

The storage modulus (G') and the loss modulus (G") together with the absolute value of the complex viscosity ($\eta^*$) as a function of the frequency ($\omega$) or the absolute value of the complex modulus (G*) are obtained by rheology measurements.

$$\eta^* = \sqrt{(G'^2 + G''^2)}/\omega$$

$$G^* = \sqrt{(G'^2 + G''^2)}$$

According to Cox-Merz rule the complex viscosity function, $\eta^*$ ($\omega$) is the same as the conventional viscosity function (viscosity as a function of shear rate), if frequency is taken in rad/s. If this empiric equation is valid, the absolute value of the complex modulus corresponds to the shear stress in conventional (that is steady state) viscosity measurements. This means that the function $\eta^*$ (G*) is the same as the viscosity as a function of shear stress.

On the other hand, shear thinning, that is the decrease of viscosity with G*, gets more pronounced the broader the molecular weight distribution is. This property can be approximated by defining a so called shear thinning index, SHI, as a ratio of the viscosity at two different shear stresses. In the present invention the shear stresses (or G*) 2.7 kPa and 210 kPa are used for calculating the $SHI_{2.7/210}$ as a measure of the broadness of the molecular weight distribution.

$$SHI_{2.7/210} = \eta^*_{2.7}/\eta^*_{210}$$

where $\eta^*_{2.7}$ is the complex viscosity at G*=2.7 kPa and $\eta^*_{210}$ is the complex viscosity at G*=210 kPa.

According to the invention, $SHI_{2.7/210}$ should preferably be 20–150, more preferably 30–100.

The melt flow rate (MFR), which is equivalent to the term "melt index" previously used, is another important property of the multimodal polyethylene according to the invention. The MFR is determined according to ISO 1133 and is indicated in g/10 min. The MFR is an indication of the flowability, and hence the processability, of the polymer. The higher the melt flow rate, the lower the viscosity of the polymer. The MFR is determined at different loadings such as 2.1 kg ($MFR_{2.1}$; ISO 1133, condition D), 5 kg ($MFR_5$; ISO 1133, condition T) or 21.6 kg ($MFR_{21}$; ISO 1133, condition G). At the present invention the multimodal polyethylene should preferably have an $MFR_5$ of 0.1–2.0 g/10 min, more preferably 0.1–1.0 g/10 min. $FRR_{21/5}$ is defined as $MFR_{21}/MFR_5$.

The melt strength is also an important property of the multimodal polyethylene polymer of the present invention. Particularly, it is an important property when extruding slotted core elements for fibre optic cables of the slotted core type. The melt strength behaviour is dependent on the polymer structure and the melt strength is an indication of the resistance of a polymer against deformation and is related to the extensional viscosity of the polymer. The melt strength is determined in terms of the force required to pull a polymer melt string. To this end a Rosand Advanced Rheometer equipped with a haul-off unit is utilized. A round hole die with a length to diameter ratio of 16/1 and a piston speed of 1 mm/min at a temperature of 190° C. is used in the capillary rheometer unit. The extrudate from the capillary rheometer is streched by a haul-off unit with stepwise increased speed and the haul-off force is measured. The melt strength is defined as the force at the speed where the extrudate breaks off. The multimodal polyethylene polymer of the present invention should have a melt strength of at least 4 g, preferably 4–10 g, more preferably 5–8 g, determined as described above.

It is previously known to produce multimodal, in particular bimodal, olefin polymers, such as multimodal polyethylene, in two or more reactors connected in series. The reactor configuration may be of type slurry/slurry, slurry/gas phase or gas phase/gas phase. As instance of this prior art, mention may be made of EP 517 868, which is hereby incorporated by way of reference as regards the production of multimodal polymers.

According to the present invention, the main polymerisation stages are preferably carried out as a combination of slurry polymerisation/gas-phase polymerisation. The slurry polymerisation is preferably performed in a so-called loop reactor. The use of slurry polymerisation in a stirred-tank reactor is not preferred in the present invention, since such a method is not sufficiently flexible for the production of the inventive composition and involves solubility problems. In order to produce the inventive composition of improved properties, a flexible method is required. For this reason, it is preferred that the composition is produced in two main polymerisation stages in a combination of loop reactor/gas-phase reactor. Optionally and advantageously, the main polymerisation stages may be preceded by a prepolymerisation, in which case up to 20% by weight, preferably 1–10% by weight, more preferably 1–5% by weight, of the total amount of polymers is produced. The prepolymer is preferably an ethylene homopolymer (HDPE). At the prepolymerisation all of the catalyst is preferably charged into a loop reactor and the prepolymerisation is performed as a slurry polymerisation. Such a prepolymerisation leads to less fine particles being produced in the following reactors and to a more homogeneous product being obtained in the end. Generally, this technique results in a multimodal polymer mixture through polymerisation with the aid of a Ziegler-Natta or metallocene catalyst in several successive polymerisation reactors. In the production of, say, a bimodal polyethylene, which according to the invention is the preferred polymer, a first main ethylene polymer fraction is produced in a first reactor under certain conditions with respect to hydrogen-gas concentration, temperature, pressure, and so forth. After the polymerisation in the first reactor, the polymer including the catalyst is separated from the reaction mixture and transferred to a second reactor, where further polymerisation takes place under other conditions. Usually, a first main polymer fraction of high melt flow rate (low molecular weight, LMW) with or without addition of comonomer is produced in the first reactor, whereas a second main polymer fraction of low melt flow rate (high molecular weight, HMW) and with addition of comonomer is produced in the second reactor. As comonomer of the HMW fraction and the LMW fraction, as the case may be, various alpha-olefins with 4–8 carbon atoms may be used, but the comonomer is preferably selected from the group consisting of 1-butene, 1-hexene, 4-methyl-1-pentene, and 1-octene. The amount of comonomer is preferably such that it comprises 0.02–5.0 mol %, more preferably 0.05–2.0 mol % of the multimodal polyethylene. The resulting end product consists of an intimate mixture of the polymers from the two reactors, the different molecular-weight-distribution curves of these polymers together forming a molecular-weight-distribution curve having a broad maximum or two maxima, i.e. the end product is a bimodal polymer mixture. Since multimodal, and especially bimodal, ethylene polymers, and the production thereof belong to the prior art, no detailed description is called for here, but reference is had to the above mentioned EP 517 868.

As hinted above, it is preferred that the multimodal polyethylene composition according to the invention is a bimodal polymer mixture. It is also preferred that this bimodal polymer mixture has been produced by polymerisation as above under different polymerisation conditions in two or more polymerisation reactors connected in series. Owing to the flexibility with respect to reaction conditions thus obtained, it is most preferred that the polymerisation is carried out in a loop reactor/a gas-phase reactor. Preferably, the polymerisation conditions in the preferred method are so chosen that a comparatively low-molecular polymer with or without comonomer is produced in one stage, preferably the first main stage, owing to a high content of chain-transfer agent (hydrogen gas), whereas a high-molecular polymer having a content of comonomer is produced in another stage, preferably the second main stage. The order of these stages may, however, be reversed.

In the preferred embodiment of the polymerisation in a loop reactor followed by a gas-phase reactor, the polymerisation temperature in the loop reactor preferably is 92–98° C., more preferably about 95° C., and the temperature in the gas-phase reactor preferably is 75–90° C., more preferably 82–87° C.

A chain-transfer agent, preferably hydrogen, is added as required to the reactors, and preferably 200–800 moles of $H_2$/kmoles of ethylene are added to the reactor, when the LMW fraction is produced in this reactor, and 0–50 moles of $H_2$/kmoles of ethylene are added to the gas phase reactor when this reactor is producing the HMW fraction.

As indicated earlier, the catalyst for polymerising the multimodal polyethylene of the invention preferably is a Ziegler-Natta type catalyst. Particularly preferred are catalysts with a high overall activity as well as a good activity balance over a wide range of hydrogen partial pressures. Furthermore, the molecular weight of the polymer produced by the catalyst is of great importance. As examples of preferred catalysts may be mentioned the catalysts disclosed in EP 688 794 and FI 980788. It has surprisingly been found that when using these catalysts in a multistage process, it is possible to obtain the polymer having the characterstics described above. These catalysts also have the advantage that the catalyst (procatalyst and cocatalyst) only needs to and, indeed, only should be added in the first polymerisation reactor. The preferred catalyst according to FI 980788 will be described in more detail below.

FI 980788 discloses a process for the production of a high activity procatalyst, characterized by the steps of reacting a support comprising a magnesium halide compound having the formula (1):

$$MgX_n(OR)_{2-n} \qquad (1)$$

wherein each same or different R is a $C_1$–$C_{20}$ alkyl or a $C_7$–$C_{26}$ aralkyl, each same or different X is a halogen, and n is an integer 1 or 2,
an alkyl metal halide compound having the formula (2):

$$(R^{11}MeX^1{}_{3-n^1})m^1 \qquad (2)$$

wherein Me is B or Al, each same or different $R^1$ is a $C_1$–$C_{10}$ alkyl, each same or different $X^1$ is a halogen, $n^1$ is an integer 1 or 2, and $m^1$ is an integer 1 or 2, a magnesium composition containing magnesium bonded to a hydrocarbyl and magnesium bonded to a hydrocarbyl oxide, said magnesium composition having the empirical formula (3):

$$R^2_{n^2}(OR^3)_{2-n^2}Mg \quad (3)$$

wherein each same or different $R^2$ is a $C_1$–$C_{20}$ alkyl, each same or different $R^3$ is a $C_1$–$C_{20}$ alkyl or a $C_1$–$C_{20}$ alkyl having a hetero element, and $n^2$ is between 0.01 and 1.99, and a titanium halide compound having the formula (4):

$$(R^4O)_{n^3}TiX^2_{4-n^3} \quad (4)$$

wherein each same or different $R^4$ is a $C_1$–$C_{20}$ alkyl, each same or different $X^2$ is a halogen, $n^3$ is 0 or an integer 1–3, and Ti is quadrivalent titanium.

By "magnesium composition" above is meant a mixture or a compound. Note that formula (3) is an empirical formula and expresses the molar amounts of alkyl $R^2$ and alkoxy $OR^3$ relative to the amount of magnesium Mg, which has been defined as 1, and differs from formulas (1), (2) and (4), which are essentially structural formulas and express the molecular structure of reagents (1), (2) and (4).

Preferably, the process comprises the subsequent steps of:
a) providing said support comprising a magnesium halide compound having the formula (1),
b) contacting said support comprising a magnesium halide compound having the formula (1) with said alkyl metal halide compound having the formula (2), to give a first product,
c) contacting said first product with said magnesium composition containing magnesium bonded to a hydrocarbyl and magnesium bonded to a hydrocarbyl oxide and having the empirical formula (3), to give a second product, and
d) contacting said second product with said titanium halide compound having the formula (4).

The support used in the process is preferably in the form of particles, the size of which is from about 1 μm to about 1000 μm, preferably about 10 μm to about 100 μm. The support material must have a suitable particle size distribution, a high porosity and a large specific surface area. A good result is achived if the support material has a specific surface area between 100 and 500 m²/g support and a pore volume of 1–3 ml/g support.

The above catalyst components (2) to (4) are reacted with a suitable catalyst support. If the catalyst components (2) to (4) are in the form of a solution of low viscosity, good catalyst morphology and therewith good polymer morphology can be achieved.

It is advantageous if in the magnesium halide compound having the formula (1), R is a $C_1$–$C_{20}$ alkoxy or a $C_7$–$C_{26}$ aralkoxy. However, it is preferable, if said compound (1) is a magnesium dihalide, most preferably $MgCl_2$ for example, the support may comprise solid $MgCl_2$, either alone as a powder, or as a powder mixture with other inorganic powders.

According to another embodiment, the support comprising a magnesium halide compound having the formula (1) comprises an inorganic oxide. Several oxides are suitable, but silicon, aluminium, titanium, chromium and zirconium oxide or mixtures thereof are preferred. The most preferred inorganic oxide is silica, alumina, silica-alumina, magnesia and mixtures thereof, uttermost preferably silica. The inorganic oxide can also be chemically pretreated, e.g. by silylation or by treatment with aluminium alkyls.

It is good to dry the inorganic oxide before impregnating it by other catalyst components. A good result is achieved if the oxide is heat-treated at 100° C. to 900° C. for a sufficient time, and thereby the surface hydroxyl groups, in the case of silica, are reduced to below 2 mmol/g $SiO_2$.

As was said above, the support may be a mixture of said magnesium halide compound (1) and another solid powder, which preferably is an inorganic oxide. According to another aspect, the support comprises particles having a core comprising said inorganic oxide and a shell comprising said magnesium halide compound having the formula (1). Then, the support comprising a magnesium halide compound having the formula (1) and an inorganic oxide can conveniently be prepared by treating particles of the inorganic oxide with a solution of the magnesium halide and removing the solvent by evaporation.

When using a support containing both said magnesium halide compound (1) and another component, the amount of magnesium halide compound (1) is such that the support contains from 1 to 20% by weight, preferably from 2 to 6% by weight, of magnesium Mg.

The process further comprises a step of reacting an alkyl metal halide compound of the formula (2):

$$(R^1_{n^1}MeX^1_{13-n^1})_{m^1} \quad (2)$$

wherein Me is B or Al, each same or different $R^1$ is a $C_1$–$C_{10}$ alkyl, each same or different $X^1$ is a halogen, $n^1$ is an integer 1 or 2, and $m^1$ is an integer 1 or 2. In formula (2), Me is preferably Al. Each same or different $R^1$ is preferably a $C_1$–$C_6$ alkyl, and, independently, the preferred same or different halogen $X^1$ is chlorine. $n^1$ is preferably 1 and $m^1$ is preferably the integer 1 or 2. Most preferably, the alkyl metal halide compound having the formula (2) is an alkyl aluminium dichloride, e.g. ethylaluminium dichloride (EADC).

The alkyl metal halide compound is preferably deposited on the support material. An even deposition is achieved if the viscosity of the agent or its solution is below 10 mPa.s at the temperature applied. To achieve this low viscosity the alkyl metal halide agent can be diluted by a non-polar hydrocarbon. The best deposition is however achieved if the total volume of the deposited alkyl metal halide solution is not exceeding the pore volume of the support, or if the excess of diluting hydrocarbon is evaporated away after the deposition of the alkyl metal halide. A good choice is to use a 5–25% hydrocarbon solution of ethyl aluminium dichloride. The chemical addition times and the addition techniques are preferably adjusted to give an even distribution of the chemical in the support material.

In the above mentioned preferred order of reaction steps a) to d), step b) can advantageously be performed so that undiluted alkyl metal halide (2) is used to treat the support comprising a magnesium halide compound having the formula (1). Alternatively, the support is contacted with a solution of the alkyl metal halide compound having the formula (2) in an essentially non-polar solvent, preferably a non-polar hydrocarbon solvent, most preferably a $C_4$–$C_{10}$ hydrocarbon. The concentration of the alkyl metal halide compound having the formula (2) in said non-polar solvent is usually 1–80% by weight, preferably 5–40% by weight, most preferably 10–30% by weight. Advantageously, the support is contacted with a solution of said alkyl metal halide compound (2) in a ratio mol of the alkyl metal halide compound (2) to grams of the support of between about 0.01 mmol/g and about 100 mmol/g, preferably about 0.5 mmol/g and about 2.0 mmol/g. The amount of reactants can also be expressed as molar ratio, whereby it is advantageous, if the molar ratio of said alkyl metal halide compound (2) to said magnesium halide compound (1) of the support is between about 0.01 mol/mol to about 100, preferably about 0.1 mol/mol to about 10, most preferably from about 0.2 to about 3.0.

In step b), the temperature of said contacting is e.g. 5–80° C., preferably 10–50° C., most preferably 20–40° C. The duration of said contacting is 0.1–3 h, preferably 0.5–1.5 h.

In the process, the magnesium composition containing magnesium bonded to a hydrocarbyl and magnesium bonded to a hydrocarbyl oxide having the empirical formula (3), each same or different $R^2$ is preferably $C_2$–$C_{10}$ alkyl, most preferably a $C_2$–$C_8$ alkyl. Each same or different $R^3$ is preferably a $C_3$–$C_{20}$ alkyl, more preferably a branched $C_4$–$C_{10}$ alkyl, most preferably a 2-ethyl-1-hexyl or a 2-propyl-1-pentyl.

The magnesium composition containing magnesium bonded to a hydrocarbyl and magnesium bonded to a hydrocarbyl oxide having the empirical formula (3) can also be expressed by its preparation. According to one embodiment, it is a contact product of a dialkyl magnesium having the formula (5):

$$R^2_2Mg \quad (5)$$

wherein each same or different $R^2$ is defined as above, and an alcohol. Preferably, the dialkyl magnesium having the formula (5) is dibutyl magnesium, butyl ethyl magnesium or butyl octyl magnesium.

The magnesium composition can also be defined in that the magnesium composition containing magnesium bonded to a hydrocarbyl and magnesium bonded to a hydrocarbyl oxide having the empirical formula (3) is a contact product of a dialkyl magnesium and an alcohol having the formula (6):

$$R^3OH \quad (6)$$

wherein each same or different $R^3$ is the same as above. Preferably, the alcohol having the formula (6) is a 2-alkyl alkanol, preferably 2-ethyl hexanol or 2-propyl pentanol. It was found, that such branched alcohols gave better results than linear alcohols.

Preferably, the magnesium composition containing magnesium bonded to a hydrocarbyl and magnesium bonded to a hydrocarbyl oxide having the empirical formula (3) is a contact product of a dialkyl magnesium and an alcohol in a molar ratio alcohol to dialkyl magnesium of 0.01–100 mol/mol, preferably 1.0–5.0 mol/mol, more preferably 1.7–2.0 mol/mol, most preferably 1.8–1.98 mol/mol. The dialkyl magnesium and the alcohol are conveniently contacted by adding the alcohol to a solution of said dialkyl magnesium in an organic solvent, e.g. a $C_4$–$C_{10}$ hydrocarbon. Then, the concentration of the solution is preferably between 1 and 50% by weight, most preferably between 10 and 30% by weight. The contacting temperature between the dialkyl magnesium and the alcohol is preferably 10–50° C., preferably from about 20° C. to about 35° C.

In step c) of the above mentioned preferred order a)→d) of the process, the contacting product of the support with the alkyl metal halide compound (2) (=said first product) is contacted with said magnesium composition containing magnesium bonded to a hydrocarbyl and magnesium bonded to a hydrocarbyl oxide and having the empirical formula (3).

Preferably, said first product is contacted with said magnesium composition (3) in a ratio moles of magnesium/g of the support between 0.001–1000 mmol/g, preferably 0.01–100 mmol/g, most preferably 0.1–10 mmol/g (g of the support means, in the case of said first reaction product, the support which was used as starting material for the first reaction product).

A good deposition of said magnesium composition as a solution is achieved if the volume of the magnesium composition (3) solution is about two times the pore volume of the support material. This is achieved if the concentration of the composition in a hydrocarbon solvent is between 5–60% in respect of the hydrocarbon used. When depositing the magnesium composition on the support material its hydrocarbon solution should have a viscosity that is lower than 10 mPa.s at the temperature applied. The viscosity of the magnesium complex solution can be adjusted for example by the choice of the group $R^4$ in the formula (3), by the choice of the concentration of the hydrocarbon solution, by the choice of the ratio between the magnesium alkyl and the alcohol or by using some viscosity lowering agent. The titanium compound can be added to the support material with or without a previous drying of the catalyst to remove the volatile hydrocarbons. Remaining hydrocarbons can if desired be removed by using slight underpressure, elevated temperature or nitrogen flash.

In the process, the transition metal compound is a titanium halide compound having the formula (4). $R^4$ is preferably a $C_2$–$C_8$ alkyl, most preferably a $C_2$–$C_6$ alkyl. $X^2$ is preferably chlorine and, independently, $n^3$ is preferably 0. Said titanium halide compound having the formula (4) is advantageously titanium tetrachloride.

According to one embodiment, in addition to said titanium compound having the formula (4), a titanium compound having the formula (7):

$$(R^5O)_{n^4}TiX^3_{4-n^4} \quad (7)$$

wherein each same of different $R^5$ is a $C_1$–$C_{20}$ alkyl, preferably a $C_2$–$C_8$ alkyl, most preferably a $C_2$–$C_6$ alkyl, each same or different $X^3$ is a halogen, preferably chlorine, $n^4$ is an integer 1–4, and Ti is quadrivalent titanium, is reacted. The titanium compound (7) always has at least one alkoxy group, which helps dissolving the titanium compound (4) which does not necessarily have alkoxide, into an organic solvent before the contacting. Naturally, the more alkoxide groups compound (4) has, the less is the need for compound (7). If compound (7) is used, the preferable combination is that of titanium tetrachloride and a titanium tetra $C_1$–$C_6$ alkoxide.

In step d) of the preferred step sequence a)→d), said second product is advantageously contacted with the titanium compound having the formula (4) in a ratio moles of said titanium compound/g of the support of 0.01–10 mmol/g, preferably 0.1–2 mmol/g. Preferably, said second reaction product is contacted with said titanium compound (4) in a ratio moles of said titanium compound (4)/total moles of the magnesium of 0.05–2 mol/mol, preferably 0.1–1.2 mol/mol, most preferably 0.2–0.7 mol/mol. The temperature is usually 10–80° C., preferably 30–60° C., most preferably from about 40° C. to about 50° C., and the contacting time is usually 0.5–10 h, preferably 2–8 h, most preferably from about 3.5 h to about 6.5 h.

Above, the process for the preparation of a high activity catalyst component for the production of olefin polymers of different molecular weight and homogenous consistence, have been described in detail.

The catalyst component has high activity both when producing low melt flow rate ethylene polymer and high melt flow rate polymer. High molecular weight polymer has high melt viscosity, i.e. low melt flow rate, and low molecular weight polymer has low melt viscosity, i.e. high melt flow rate.

Simultaneously or separately, it preferably produces ethylene homopolymer and copolymer with low gel content. Most preferably it produces ethylene homopolymer having a gel number, expressed as number of gel spots/sq.m in a film prepared from the material, of 0. This means, that by the standards used, the catalyst components can be used to produce totally homogenous (gelless) low and high molecular weight ethylene polymer.

The alkyl metal halide compound of the formula (2) can, if used, act completely or partially as a cocatalyst. However, it is preferable to add a cocatalyst having the formula (9):

$$R^6_n{}^5AlX^4_{3-n}{}^5 \quad (9)$$

wherein $R^6$ is a $C_1$–$C_{20}$ alkyl, preferably a $C_1$–$C_{10}$ alkyl, most preferably a $C_2$–$C_6$ alkyl such as ethyl, X is halogen, preferably chlorine, n is 1 to 3, more preferably 2 or 3, most preferably 3, to the polymerization mixture. The cocatalyst having the formula (9) can be used irrespective of whether said alkyl metal halide compound (2) is used or not.

Although the invention has been described above with reference to a specified multimodal polyethylene, it should be understood that this multimodal polyethylene may include various additives such as fillers, etc. as is known and conventional in the art.

Having thus described the present invention it will now be illustrated by way of non-limiting examples of preferred embodiments in order to further facilitate the understanding of the invention.

EXAMPLES

Example 1

Preparation of the Catalyst
Complex Preparation 8.6 g (66.4 mmol) of ethyl-1-hexanol was added slowly to 27.8 g (33.2 mmol) of a 19.9% by weight solution of butyl octyl magnesium. The reaction temperature was kept under 35° C. This complex was used in catalyst preparations. The molar ratio of 2-ethyl-1-hexanol to butyl octyl magnesium was 2:1.

Catalyst Preparation 3.7 g (1.0 mmol/g carrier) of 20% ethyl aluminium dichloride was added to 5.9 g of Sylopol 5510 silica/MgCl$_2$ carrier and the mixture was stirred for one hour at 30° C. 5.7 g (0.9 mmol/g carrier) of complex prepared according to "Complex preparation" was added and the mixture was stirred for 4 hours at 35–45° C. 0.6 g (0.55 mmol/g carrier) of TiCl$_4$ was added and the mixture was stirred for 4 hours at 35–45° C. The catalyst was dried at 45–80° C. for 3 hours. The composition of the catalyst obtained was Al 1.8%, Mg 3.9% and Cl 18.5% by weight.

Examples 2–5 and Comparative Examples 1–6

The bimodal polyethylene polymers of Examples 2–5 according to the present invention were prepared by prepolymerisation i a loop reactor, followed by polymerisation of the LMW fraction in a loop reactor and the HMW fraction in a gas-phase reactor. More particularly, the polymerisations were carried out as follows.

Into a 50 dm$^3$ loop reactor was added 7.0 g/h of catalyst prepared according to Example 1, 2 kg/h of ethylene, 20 kg/h of propane and 1 g/h of hydrogen. The operating temperature was 80° C. and the operating pressure 65 bar.

The slurry was taken out of the reactor and led into a 500 dm$^3$ loop reactor. The reactor was operated at 95° C. temperature and 61 bar pressure. No comonomer was fed into the loop reactor.

From the loop reactor the polymer was transferred into a gas phase reactor where the polymerisation was continued. The reactor was operated at 85° C. and 20 bar pressure. Ethylene, hydrogen and 1-butene were fed into the reactor to obtain such conditions that the polymer had the properties given in table 1.

Thereafter another bimodal polyethylene polymer outside the present invention (Comparative Example 1) was prepared in a similar way, but with higher values of MFR$_5$ and MFR$_{21}$. This bimodal polymer did not satisfy the condition of a viscosity of at least 150 kPa.s at a shear stress of 2.7 kPa.

As further comparison two prior art unimodal ethylene polymers (Comparative Examples 2 and 3) were tested. The unimodal ethylene polymer of Comparative Example 2 was a blend of 80% by weight of LDPE and 20% by weight of HDPE. The details of these comparative polymers are given in Table 2. None of the comparative polymers satisfied the condition that the viscosity is at least 150 kpa.s at a shear stress of 2.7 kPa.

From a comparison of the data for the polymers in Tables 1 and 2 it is evident that the bimodal ethylene polymer of the present invention has a superior dimensional stability as defined by $\eta_{2.7}$ kPa. Further, the melt strength, determined as described previously, is higher for the polymer of the present invention.

The processability was evaluated with a Gottfert extrusiometer 130 mm, with a 20 D screw (compression 3:1). The die used was a so-called tele-die (0.6 mm diameter). The temperature profile was 160/175/180/180° C. The extruder pressure in bar and the output in kg/h were determined at the screw speeds 20, 40, 60 and 80 rpm, respectively. The results are given in Tables 1 and 2. From the results it is evident that in spite of the low MFR$_5$ values of the bimodal polymers of the present invention, they give a similar or even better output at a similar screw pressure compared to the comparative polymers of Comparative Examples 1–3.

In addition to the above advantageous properties of the bimodal polymers of the present invention, their overall mechanical properties, such as elongation at yield and break, tensile strength at yield and ultimate tensile strength at break are also good, as is seen from Table 1. The mechanical properties were determined on compression moulded dumbbells according to ISO 527-2-93/5A. The rate of grip separation was 50 mm/min.

The shrinkage of the polymers was determined in accordance with VDE 0472, Teil 630 where the shrinkage is measured in 500 mm cable samples after five temperature cycles between room temperature and 80° C. The cables were extruded on a pilot cable line with a 60 mm/24 D extruder with the temperatures set at 170/175/180/190/190/210° C., respectively. The line speed was 75 m/min. A jacket of 1 mm thickness was extruded directly onto a single aluminium conductor using a semi-tube die (cable outer diameter 5 mm).

After having tested the properties of the bimodal polyethylenes of Examples 2–5 according to the present invention, they were used for making slotted cores for fibre optical cables as described previously. The polymers were easy to process into slotted core elements of both helical and SZ-type and the slotted core elements had excellent definition, i.e. their slots and ridges had sharp edges and exact dimensions. Further, the dimensional stability of the slotted core elements after extrusion was excellent.

TABLE 1

| | Ex. 2 | Ex. 3 | Ex. 4 | Ex. 5 |
|---|---|---|---|---|
| LMW:HMW (split) | 40:60 | 40:60 | 40:60 | 46:54 |
| MFR$_2$ (loop) (g/10 min) | 500 | | 500 | 390 |
| MFR$_5$ (g/10 min) | 0.11 | 0.16 | 0.23 | 0.3 |
| MFR$_{21}$ (g/10 min) | 3.2 | 4.7 | 5.9 | 8.7 |
| FRR$_{21/5}$ | 29 | 29 | 26 | 29 |
| $\eta_{2.7\ kPa}$ (kPa.s) | 400 | 318 | 224 | 175 |
| SHI$_{2.7/210}$ | 40 | 34.5 | 37.9 | 49.4 |
| Melt strength (g) | 7.53 | 6.87 | 5.68 | 5 |
| Speed at break (m/min) | 10 | 12 | 25 | 18 |
| Density (g/cm$^3$) | 950 | 954.7 | 945.5 | 949 |
| Comonomer (% by weight) | 0.31 | 0.11 | 1.8 | 1.3 |
| Comonomer | 1-butene | 1-butene | 1-butene | 1-butene |
| Shrinkage (%) | 3.3 | 3 | 2.9 | 2.2 |
| Elongation at yield (%) | 8.8 | 8.3 | 11.0 | 8.3 |
| Tensile strength at yield (MPa) | 22.9 | 27.3 | 21.1 | 27.8 |
| Elongation at break (%) | 780 | 1060 | 940 | 790 |
| Ultimate tensile strength (MPa) | 41 | 45 | 36 | 42 |
| Extruder: Screw speed (rpm) | | | | |
| 20 Pressure (bar) | 350 | 330 | 350 | 370 |
| 20 Output (kg/h) | 1.26 | 1.44 | 1.50 | 1.32 |
| 40 Pressure (bar) | 390 | | 415 | 430 |
| 40 Output (kg/h) | 2.94 | | 2.70 | 2.58 |
| 60 Pressure (bar) | 410 | | 435 | |
| 60 Output (kg/h) | 4.08 | | 3.48 | |
| 80 Pressure (bar) | 420 | | 440 | |
| 80 Output (kg/h) | 4.74 | | 3.96 | |

TABLE 2

| | Comp. Ex. 1 | Comp. Ex. 2 | Comp. Ex. 3 |
|---|---|---|---|
| LMW:HMW (split) | 45:55 | | |
| MFR$_2$ (loop) (g/10 min) | 280–300 | | |
| MFR$_5$ (g/10 min) | 1.5 | 1.1 | 2.9 |
| MFR$_{21}$ (g/10 min) | 30 | 22 | 56 |
| FRR$_{21/5}$ | 20 | 20 | 19 |
| $\eta_{2.7kPa}$ (kPa.s) | 27.1 | 42.5 | 19 |
| SHI$_{2.7/210}$ | 23.1 | ~100 | 41.8 |
| Melt strength (g) | 1.93 | 4.76 | 2.02 |
| Speed at break (m/min) | 80 | 20 | 50 |
| Density (g/cm$^s$) | 958 | 928.2 | 947 |
| Comonomer (% by weight) | 0.17 | | |
| Comonomer | 1-butene | | 1-hexene |
| Shrinkage (%) | 1.5 | 0.3 | 1.7 |
| Elongation at yield (%) | 8.8 | 12.8 | 10.9 |
| Tensile strength at yield (MPa) | 31.4 | 14.2 | 22.3 |
| Elongation at break (%) | 1080 | 1100 | 1250 |
| Ultimate tensile strength (MPa) | 43 | 23 | 32 |
| Extruder: Screw speed (rpm) | | | |
| 20 Pressure (bar) | 325 | 300 | 360 |
| 20 Output (kg/h) | 1.50 | 1.56 | 1.32 |
| 40 Pressure (bar) | 360 | 400 | 440 |
| 40 Output (kg/h) | 3.00 | 2.94 | 2.82 |
| 60 Pressure (bar) | 390 | 450 | |
| 60 Output (kg/h) | 4.32 | 4.38 | |
| 80 Pressure (bar) | 410 | | |
| 80 Output (kg/h) | 6.54 | | |

What is claimed is:

1. A multimodal polymer composition for fibre optic cables, characterised in that it comprises a multimodal polyethylene with a density of 0.920–0.965 g/cm$^3$ and a viscosity at a shear stress of 2.7 kPa ($\eta_{2.7\ kPa}$) of at least 150 kpa.s, said multimodal polyethylene comprising a low molecular weight (LMW) ethylene homo- or copolymer fraction and a high molecular weight (HMW) ethylene copolymer fraction, said multimodal polyethylene composition having a weight ratio of the LMW fraction to the HMW fraction of (35–55):(65–45).

2. A multimodal polymer composition as claimed in claim 1, wherein the multimodal polyethylene has a shear thinning index (SHI) defined as the ratio of the viscosities at shear stresses of 2.7 and 210 kPa, respectively, of SHI$_{2.7/210}$= 20–150.

3. A multimodal polymer composition as claimed in claim 1, wherein the weight ratio of the LMW fraction to the HMW fraction is (43–51):(57–49).

4. A multimodal polymer composition as claimed in claim 1, wherein the multimodal polymer has an MFR$_5$ of 0.1–2.0 g/10 min.

5. A multimodal polymer composition as claimed in claim 1, wherein the multimodal polymer has a melt strength of at least 4 g at 190° C.

6. A multimodal polymer composition as claimed in claim 1, wherein the multimodal polymer is a bimodal polyethylene produced by (co)polymerisation in two main polymerisation steps.

7. A multimodal polymer composition as claimed in claim 1, wherein the ethylene copolymer of the HMW fraction is a copolymer of ethylene and a comonomer selected from the group consisting of 1-butene, 1-hexene, 4-methyl-1-pentene, and 1-octene.

8. A multimodal polymer composition as claimed in claim 1, wherein the amount of comonomer is 0.02–5.0 mol % of the multimodal polymer.

9. A multimodal polymer composition as claimed in claim 1, wherein the polymer has been obtained by slurry polymerisation in a loop reactor of an LMW ethylene homo- or copolymer fraction, followed by gas-phase polymerisation of an HMW ethylene copolymer fraction.

10. A multimodal polymer composition as claimed in claim 9, wherein the slurry polymerisation is preceded by a prepolymerisation step.

11. A multimodal polymer composition as claimed in claim 10, wherein the polymer has been obtained by prepolymerisation in a loop reactor, followed by slurry polymerisation in a loop reactor of an LMW ethylene homo- or copolymer fraction, and a gas-phase polymerisation of an HMW ethylene copolymer fraction.

12. A multimodal polymer composition as claimed in claim 9, wherein polymerisation procatalyst and cocatalyst are added to the first polymerisation reactor only.

13. A multimodal polymer composition as claimed in claim 12, wherein the polymerisation catalyst is a Ziegler-Natta type catalyst.

14. A fibre optic cable, characterized in that the cable has a fibre supporting element selected from slotted cores and buffer tubes, and that the fibre supporting element consists of a multimodal polymer composition according to claim 1.

15. A fibre optic cable as claimed in claim 14, wherein the fibre supporting element is a slotted core.

* * * * *